Hallowell & Barker,
Globe Valve,

Nº 51,177. Patented Nov. 28, 1865.

Witnesses:
C. P. Hale
G. H. Washburn

Inventor:
Albert Hallowell and H. R. Barker,
by their Attorney
R. H. Eddy

UNITED STATES PATENT OFFICE.

ALBERT HALLOWELL AND H. R. BARKER, OF LOWELL, MASSACHUSETTS.

IMPROVEMENT IN STEAM-COCKS.

Specification forming part of Letters Patent No. 51,177, dated November 28, 1865.

*To all whom it may concern:*

Be it known that we, ALBERT HOLLOWELL and HORACE R. BARKER, of Lowell, in the county of Middlesex and State of Massachusetts, have invented an Improved Steam-Cock; and we do hereby declare the same to be fully described in the following specification, and represented in the accompanying drawings, in which—

Figure 2:
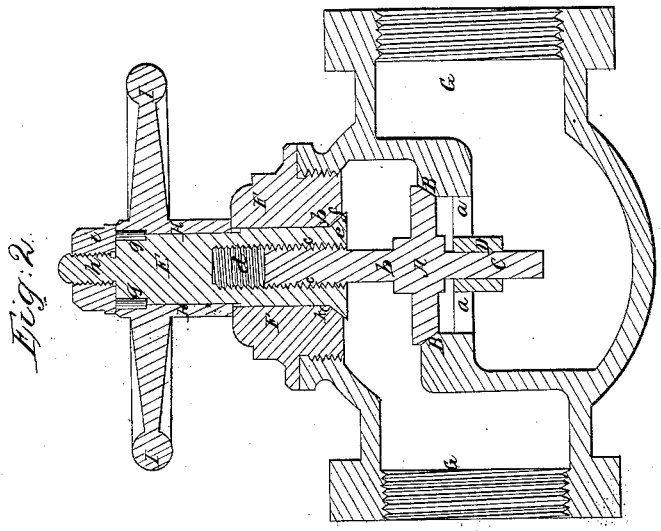
Figure 1:
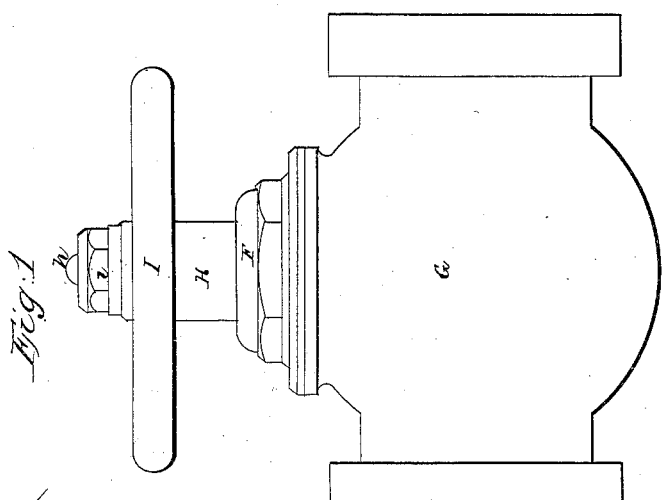

Figure 1 is an external elevation, and Fig. 2 a vertical section, of it.

Much difficulty has been experienced in preventing leakage of the joint of the key or valve-stem of a common steam-cock, and various have been the modes adopted to obviate this difficulty.

In our improved steam-cock we have no elastic and perishable packing to the key for operating the valve, and we provide the said valve with a prismatic projection, C, or its equivalent, to extend from and below it, and to enter a corresponding hole made through a guide, D, held in place in the water-passage of the valve-seat by two or more radial arms, $a\ a$. Furthermore, we form a male screw, $c$, on the upper part of the stem $b$ of the valve, such screw entering a corresponding female screw, $d$, made axially in a cylindrical key, E, which goes concentrically through the cap F of the case G of the steam-cock.

The said cylindrical key and the cap F we provide with a ground conical joint, the male part of the joint being shown at $e$ and the female part at $f$. A tube, H, arranged concentrically within and attached to the hand-wheel I, encompasses that portion of the key E which projects above the cap F. The said tube H extends a short distance above the key E, and supports a screw-nut, $i$, which rests on the upper end of the tube H, and screws upon a male screw, $h$, projecting upward from the key E. One or more pins, $g$, should be inserted vertically within the tube H and the key E, the same being in manner as shown in Fig. 2. The nut $i$, by resting on the tube H, which, in turn, is supported on the cap F, affords, with the screw $h$, a means of drawing the part $e$ of the joint up to its seat, $f$, as may be necessary to keep them in proper contact and compensate for their wear.

By revolving the hand-wheel I we simultaneously turn the key E so as to move the valve A either off or toward its seat.

The ground joint affords a much better means of rendering the connection of the cap F and the key steam-tight than any destructible caoutchouc or elastic packing, such as is commonly employed for such purposes in steam-cocks.

Besides its adjustments, the ground joint enables us to keep it tight, as it may wear. There is arranged above the said joint and on the cap F an annular chamber or groove, $k$, the object of which is to hold oil or grease to keep the rubbing-surface of the ground joint properly lubricated.

We would remark that the shank $b$ of the valve may be prismatic and enter a corresponding prismatic opening made in the key E, in which case the part C should screw into the part D. Under these circumstances the valve A, while being either raised or depressed by the key, would revolve with such key; but when the shank $b$ screws into the key and the projection C is prismatic, the valve will not revolve with the key. So, instead of making a female screw on the key E, and a corresponding male screw on the shank of the valve, a male screw may be projected from the key and enter a female screw formed in the valve or its shank. Our improvement will suffice for either of these constructions, but we prefer that exhibited in the drawings.

By arranging the ground joint at the lower parts of the key and the cap the pressure of steam in the case G will be caused to aid in keeping the joint tight by forcing the male part $e$ against its seat $f$.

We claim as of our invention—

1. The arrangement of the ground joint $e f$ at the lower parts of the cap F, and the key E, applied to such cap F, as described.

2. The arrangement of the hand-wheel I or the same and the tube H, the screw $h$, nut $i$, the key-shank E, the ground joint $e f$, and the cap-screw F, applied to the case G, and shank $b$ of the valve A, substantially as hereinbefore specified.

3. The arrangement of the annular groove $k$ with the ground joint $e f$, and the key E and cap F, connected with the valve and its case, substantially as described.

ALBERT HALLOWELL.
      HORACE R. BARKER.

Witnesses:
 EDWIN A. ALGER,
 DAVID K. HILL.